Aug. 1, 1933.  B. V. NAGASHEV  1,920,803
CONTROL SYSTEM FOR ALTERNATING CURRENT MOTORS
Filed Oct. 11, 1930
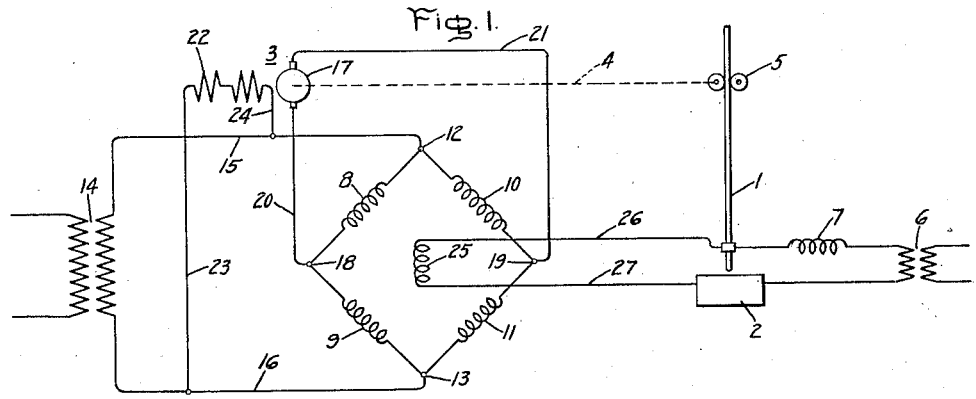
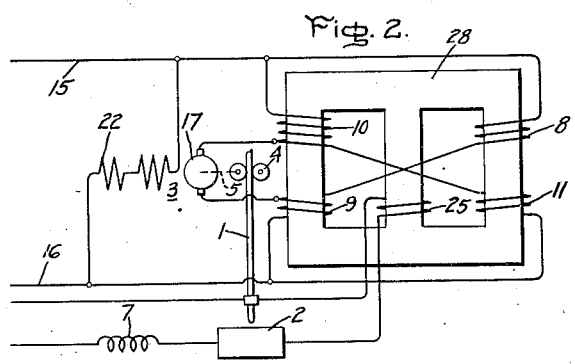
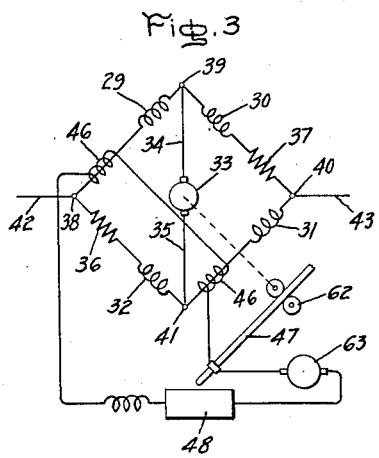
Inventor:
Boris V. Nagashev,
by Charles E. Tullar
His Attorney.

Patented Aug. 1, 1933

1,920,803

UNITED STATES PATENT OFFICE 1,920,803

CONTROL SYSTEM FOR ALTERNATING CURRENT MOTORS

Boris V. Nagashev, Lynn, Mass., assignor to General Electric Company, a Corporation of New York Application October 11, 1930. Serial No. 488,077

4 Claims. (Cl. 172—274)

My invention relates to control systems for alternating current motors.

It is an object of my invention to provide an improved system of control for alternating current motors by means of which a motor may be reversed as to direction of rotation and run satisfactorily in both directions without the making or breaking of electrical circuits or the displacement of movable elements.

My improved motor controlling means may be used for motor control wherever it is found applicable. It may be used for controlling the movable element of an induction regulator, for adjusting the loading spring of a turbine governor in order to regulate the valve opening of the turbine, or for controlling the pilot motor of any regulating system. It is particularly suited for controlling the motor employed for operating the feeding mechanism of an automatic arc welding machine to feed an electrode toward and away from another electrode to draw and thereafter maintain an arc of predetermined characteristics, and I will consequently illustrate and describe my invention as applied to automatic arc welding.

My invention will be better understood from the following description taken in connection with the accompanying drawing and its scope will be pointed out in the appended claims.

Fig. 1 of the drawing diagrammatically illustrates circuit connections according to one embodiment of my invention, and Fig. 2 one arrangement of the coils illustrated in the bridge or balanced circuit of Fig. 1. Figs. 3 and 4 illustrate another embodiment of my invention adapted for use with a direct current source of welding current. The arrangement shown in Figs. 1 and 2 is particularly suitable for alternating current welding circuits, although it can be modified as will be pointed out below for use with direct current welding circuits.

In the diagrammatic arrangement shown in Fig. 1 a welding electrode 1 is fed toward and away from the work 2 constituting a cooperating electrode, by means of a feed motor 3. This motor may be mechanically connected, by means indicated in the drawing by the dotted line 4, to an electrode feeding mechanism comprising feed rolls 5. The electrodes 1 and 2 are electrically connected in a power circuit suitable for welding purposes which is illustrated as comprising a transformer 6 of usual construction and a reactance 7 connected in circuit therewith to obtain the desired dropping characteristic. A transformer having a high internal reactance may be used in place of the transformer 6 and reactance 7.

The direction and speed of rotation of the feed motor 3 is controlled by varying, in accordance with a characteristic of the welding circuit, the balance of a bridge circuit in which it is connected. In the particular arrangement illustrated four coils 8, 9, 10 and 11 and the feed motor 3 are so related to one another as to constitute a Wheatstone bridge, terminals 12 and 13 of which are connected to a source of alternating current supply 14 by means of conductors 15 and 16. The armature 17 of the feed motor is connected across the remaining terminals 18 and 19 of the bridge through conductors 20 and 21. Field 22 of the feed motor is connected across the source of alternating current supply by conductors 23 and 24.

The flux distribution in coils 8, 9, 10 and 11 is controlled by means of a coil 25 associated therewith. This coil is connected through conductors 26 and 27 to the welding circuit including electrodes 1 and 2, so that its excitation will vary in response to variations in the characteristics of the welding circuit. In the arrangement illustrated the coil 25 is connected to the electrodes 1 and 2 across the welding arc and is responsive to arc voltage. It is to be understood, however, that this coil may be responsive to welding current, to welding current and arc voltage, or to any other desired welding circuit characteristic.

One arrangement of the coils 8, 9, 10 and 11 on a magnetic core structure 28 is illustrated in Fig. 2. The magnetic structure here illustrated is a three-legged core structure with coils 9, 10 and 8, 11 arranged on the outside legs and coil 25 arranged on the middle leg thereof. The coil arrangement is such that when the instantaneous potential of conductor 15 is positive with respect to conductor 16, current flows in each coil in a direction to circulate flux in the outside legs of the core structure 28 in a clockwise direction. At the same time coil 25 is so connected in the welding circuit that it sends flux upward in the middle leg of the core structure. That is, the flux due to coil 25 opposes the flow of flux through coils 9 and 10 but assists the flow of flux through coils 8 and 11.

The characteristic features of applicant's invention will be best understood by considering the operation of the particular system above described. With the turns in coil 10 greater than the turns in coils 8, 9 and 11, as illustrated in Figs. 1 and 2, the instantaneous potential of bridge terminal 18 is positive with respect to the potential of bridge terminal 19, it being assumed that the potential of conductor 15 is positive with respect to the potential of conductor 16. Current will consequently be sent through the armature 17 of the feed motor 3 from terminal 18 through conductors 20 and 21 to terminal 19. However, due to current flowing in coil 25 the flux balance in core 28 will be disturbed so that the flux through coils 8 and 11 will be strengthened and the flux through coils 9 and 10 weakened. Consequently, the potential of terminal 18 will be decreased and the potential of terminal 19 increased relative to what it was before when coil 25 is excited. The polarity may be actually reversed. If the difference in the potential between terminals 18 and 19 is decreased the speed of the motor 3 will decrease, and if the potential of the terminals 18 and 19 reverses the motor armature 17 of the feed motor will also reverse due to the reverse direction of flow of current through it. Consequently, depending upon the voltage of the arc which determines the excitation of coil 25, the speed and direction of rotation of the motor 3 is controlled to feed the electrode 1 toward and away from the work 2 to maintain the desired voltage determined by the relative adjustment of the control circuits. By varying the degree of excitation or the turns of the several coils the system may be made to regulate for any desired welding arc characteristic.

The adjustment of the bridge circuit will depend upon the nature of the welding operation to be performed. If non-consuming electrodes such as carbon or tungsten are used, the feed motor will normally be stationary and only once in a while will it be operated to advance the electrodes relative to one another to compensate for their slow consumption of the arc. On the other hand, if a fusible electrode such as is employed in metallic arc welding is used, the motor will be in substantially continuous operation at all times to feed the electrode at the proper rate of speed to maintain a welding arc of desired characteristics. Thus, the adjustment of the bridge will depend on the desired operating conditions. In all cases, however, the operation of the system is the same; that is, a magnetic bridge is controlled by electromagnetic means responsive to a characteristic of the welding circuit to cause current to flow in a feed motor circuit in the proper amount and in the proper direction to feed the electrode toward and away from the work to strike and maintain a welding arc.

When the source of welding current is alternating the coil 25 may be connected directly across the welding electrodes 1 and 2. If, however, the welding source is a direct current source it will be necessary to connect coil 25 to a source of alterating current and to vary the amount of current flowing in said circuit by means of a direct current relay responsive to conditions in the welding circuit. Such an arrangement, however, is not necessary if the connections illustrated in Figs. 3 and 4 of the drawing are employed.

In Figs. 3 and 4 the bridge circuit comprises coils 29, 30, 31 and 32. The feed motor armature 33 is connected in the galvanometer circuit of the bridge by conductors 34 and 35 and the fields 36 and 37 of the feed motor are connected in series with coils 29, 30 and 31, 32 in diametrically opposed branches of the bridge. Bridge terminals 38 and 40 are connected to a source of alternating current supply 42, 43. The other terminals of the bridge 39 and 41 define the galvanometer circuit of the bridge. As illustrated in Fig. 4 coils 32 and 30 are located on a magnetic core 44 and coils 29 and 31 are located on a magnetic core 45. A controlling coil 46, diagrammatically illustrated in Fig. 3 as divided and associated with coils 29 and 31, is also located on core 45. This coil is employed to vary the impedance of coils 39 and 30 by controlling the saturation of the core 45 on which these coils are located. It is connected across the welding electrodes 47 and 48 by conductors 49, 50 and a choke coil 61 inserted in the circuit to prevent induced alternating currents flowing through the welding arc. Other arrangements may be employed for preventing alternating currents flowing in the direct current circuit. For example, coil 46 may be divided into two parts, each of which is associated with one of the coils 29 and 31 of the bridge so that the voltage induced in one-half of the coil 46 opposes that induced in the other half of the coil 46. When such an arrangement is used, the choke coil 61 is unnecessary. The feed motor armature 33 is represented as connected to feed rolls 62 for feeding electrode 47 toward and away from its cooperating electrode 48. A source of welding supply is illustrated at 63 as a direct current dynamo electric machine of suitable design to give the desired dropping welding characteristic. Instead of employing a generator inherently giving the desired welding characteristic, a constant potential generator with resistance connected to the welding circuit may be employed.

The arrangement illustrated in Figs. 3 and 4 operates as follows: The impedance of the two branches of the bridge including coils 30 and 32 is constant, but the impedance of the other two branches of the bridge including coils 29 and 31 is variable. The desired variation in impedance is achieved by changing the permeability of the iron core 45 by varying its saturation by flux produced by coil 46. The excitation of coil 46 varies with the voltage of the welding arc. Thus, depending upon arc voltage which varies with arc length, the saturation of core 45 is controlled through the agency of coil 46, and the impedance of coils 29 and 31 varied accordingly. This change in the impedance of coils 29 and 31 controls the direction and flow of current in the bridge circuit of which they form a part, and the amount and direction of current flowing through the feed motor armature 33. The motor consequently rotates in the proper direction and at the proper speed to maintain the arc length and voltage at the desired value.

It is to be noted that in arrangements according to my invention no arcing contacts or movable parts whatsoever need be employed. Therefore, no changed conditions will be introduced into systems according to my invention during its normal operation. Once adjusted the systems will maintain their regulation indefinitely.

My invention is particularly applicable to that form of welding in which an arc is drawn between an electrode and an article to be welded, but is not limited to that form of welding since it may be used in any form of arc welding for striking and maintaining a welding arc.

The particular systems illustrated and described have been shown diagrammatically in order to explain the invention. Switches in the various circuits have been omitted which in actual embodiments would be employed. For example, switches would be used for making and breaking the welding and bridge exciting circuits and, under certain conditions, these switches would be interlocked so as to energize and deenergize these circuits simultaneously. Likewise the several coils of the bridges illustrated and described may in practice be provided with taps for changing their effective turns. The same result may be obtained by shunting the coils with suitable resistances to control their excitation and resistance in series with the coils may be used. These and other details may be incorporated in systems according to my invention without departing from the principles thereof. Furthermore, the particular arrangements employed may be greatly varied without departing from the spirit of my invention. I therefore aim to cover in the appended claims such modifications and variations as fall within the true spirit and scope of my invention.

What I claim as new and desire to secure by Letters Patent of the United States, is:

1. A motor control system comprising an alternating current motor, a bridge circuit, means for connecting said motor in said circuit, a coil in said circuit, a magnetic structure for said coil, a magnetizing winding on said magnetic structure, means for connecting said magnetizing winding and said bridge to a source of alternating current electromotive force and means for regulating the energization of said magnetizing winding.

2. A motor control system comprising a source of alternating current electromotive force, an alternating current motor, a plurality of parallel circuits, a coil in one of said circuits, means for connecting said parallel circuits, said motor and said source of electromotive force in the form of a Wheatstone bridge with said motor connected across said bridge and said coil in one branch thereof, a magnetic structure for said coil, a magnetizing winding on said magnetic structure, means for connecting said magnetizing winding to a source of alternating current electromotive force and means for regulating the energization of said magnetizing winding.

3. A motor control system comprising a Wheatstone bridge circuit containing at least two coils each of which is connected between different terminals of said bridge, a magnetic core structure for said coils, a source of alternating current electromotive force, an alternating current motor, means for connecting said motor to one pair of oppositely disposed terminals of said bridge, means for connecting the other pair of terminals of said bridge to said source of alternating current elemtromotive force, a magnetizing winding on said core structure adapted when energized with alternating current to simultaneously strengthen the flux through one of said coils and weaken the flux through another of said coils, means for connecting said magnetizing winding to a source of alternating current electromotive force, and means for regulating the energization of said magnetizing winding.

4. A motor control system comprising a source of alternating current electromotive force, a three legged magnetic core structure, two coils on each of the outside legs of said core structure, means for connecting said coils in the form of a Wheatstone bridge to said source of alternating current electromotive force with the flux due to each coil in a common direction in the outside legs of said core structure, an alternating current motor having a plurality of circuits, means for connecting one of said motor circuits to one pair of oppositely disposed terminals of said bridge, means for connecting the other pair of oppositely disposed terminals of said bridge and another of said motor circuits to said source of alternating current electromotive force, a magnetizing winding on the middle leg of said core structure, means for connecting said coil to a source of alternating current electromotive force, and means for regulating the energization of said magnetizing winding.

BORIS V. NAGASHEV.